(12) United States Patent
Chan et al.

(10) Patent No.: US 10,904,729 B2
(45) Date of Patent: Jan. 26, 2021

(54) SYSTEM AND METHOD FOR IMPROVED CAPACITY USING CHANNEL MULTIPLEXING

(71) Applicant: Verizon Patent and Licensing Inc., Arlington, VA (US)

(72) Inventors: Yee Sin Chan, San Jose, CA (US); Jin Yang, Orinda, CA (US); Jignesh S. Panchal, Hillsborough, NJ (US); Lei Song, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/384,614

(22) Filed: Dec. 20, 2016

(65) Prior Publication Data

US 2018/0176889 A1 Jun. 21, 2018

(51) Int. Cl.
*H04W 4/70* (2018.01)
*H04L 5/00* (2006.01)

(52) U.S. Cl.
CPC ............ *H04W 4/70* (2018.02); *H04L 5/0007* (2013.01); *Y02D 30/70* (2020.08)

(58) Field of Classification Search
None
See application file for complete search history.

(56) References Cited

U.S. PATENT DOCUMENTS

| | | | | |
|---|---|---|---|---|
| 8,837,271 | B1* | 9/2014 | Mansour | H04J 13/18 370/208 |
| 2005/0232138 | A1 | 10/2005 | Byun et al. | |
| 2007/0086535 | A1* | 4/2007 | Wang | H04L 5/0023 375/260 |
| 2011/0085503 | A1* | 4/2011 | Nam | H04L 5/0048 370/329 |
| 2011/0096855 | A1* | 4/2011 | Youn | H04B 10/532 375/260 |
| 2013/0256533 | A1 | 10/2013 | Bae et al. | |
| 2014/0153499 | A1 | 6/2014 | Wang et al. | |
| 2014/0369223 | A1* | 12/2014 | Takeda | H04J 11/0093 370/252 |

(Continued)

OTHER PUBLICATIONS

"Increasing PUSCH spectral efficiency in efeMTC", Nokia, Alcatel-Lucent Shanghai Bell, 3GPP TSG RAN WG1 Meeting #88bis, Spokane, USA, Apr. 3-7, 2017, 4 pages.

*Primary Examiner* — Huy D Vu
*Assistant Examiner* — Bao G Nguyen

(57) ABSTRACT

A base station may receive repetitive data transmitted using a particular set of radio resources The base station may apply a first orthogonal pattern, assigned to a first user equipment (UE), to a segment of subframes of the received repetitive data. The base station may apply a second orthogonal pattern, assigned to a second UE, to the segment of subframes of the received repetitive data. The base station may determine first repetitive data, transmitted by the first UE using the particular set of radio resources, based on applying the first orthogonal pattern to the segment of subframes of the received repetitive data. The base station may determine second repetitive data, transmitted by the second UE using the particular set of radio resources, based on applying the second orthogonal pattern to the segment of subframes of the received repetitive data.

20 Claims, 14 Drawing Sheets

(56) References Cited

U.S. PATENT DOCUMENTS

| | | | |
|---|---|---|---|
| 2015/0078348 A1* | 3/2015 | Han | H04W 4/70 |
| | | | 370/336 |
| 2015/0229505 A1* | 8/2015 | Porat | H04B 7/0452 |
| | | | 370/329 |
| 2015/0312026 A1* | 10/2015 | Kim | H04L 27/2692 |
| | | | 370/338 |
| 2015/0327289 A1 | 11/2015 | Hessler et al. | |
| 2016/0165585 A1* | 6/2016 | Saiwai | H04W 72/048 |
| | | | 370/329 |
| 2016/0218836 A1* | 7/2016 | Yamamoto | H04W 72/1284 |
| 2017/0171865 A1* | 6/2017 | Hwang | H04L 5/00 |
| 2018/0176889 A1* | 6/2018 | Chan | H04L 5/0007 |

* cited by examiner

FIG. 7C

SYSTEM AND METHOD FOR IMPROVED CAPACITY USING CHANNEL MULTIPLEXING

BACKGROUND

Narrowband technologies, such as Cat-M1 and Cat NB1 refine LTE technology for use in "Internet of Things" (IoT) and machine-to-machine (M2M) applications. These categories allow for LTE to be cost efficient and power efficient as required by many applications that need a relatively low amount of throughput.

BRIEF DESCRIPTION OF THE DRAWINGS

FIGS. 7A-7C are diagrams of an example implementation relating to the example process shown in FIG. 6;

DETAILED DESCRIPTION OF PREFERRED EMBODIMENTS

The following detailed description of example implementations refers to the accompanying drawings. The same reference numbers in different drawings may identify the same or similar elements.

A narrowband solution for LTE, such as Cat-M1, may rely on repetitive data transmissions in order to improve coverage. For example, user equipment (UE) (e.g., an IoT device, a M2M device, a user device, or the like) may repeat data in multiple consecutive subframes (e.g., in 10 consecutive subframes, in 30 consecutive subframes, in 100 consecutive subframes, or the like) in order to improve coverage. As a particular example, a Cat-M1 UE transmitting voice over LTE (VoLTE) data (e.g., one packet of data) may transmit the data 32 times in 32 consecutive subframes (e.g., where each subframe is 1 millisecond (ms) in duration).

However, transmission of repetitive data by the UE means that other UEs may be prevented from transmitting using the radio resources used by the UE for the repetitive transmission. For example, in a case where six physical resource blocks (PRBs) are available on the uplink (e.g., 1.4 megahertz (MHz) of bandwidth), if a UE requires three PRBs for a transmission (e.g., 540 MHz), then only two UEs may be supported at a given time. This may cause delay in transmissions by the other UEs, and is not an efficient use of available radio resources.

Implementations described herein may provide for channel multiplexing that allows a base station to receive and decode repetitive data transmissions from multiple UEs that use the same set of radio resources to transmit the repetitive data. This allows more efficient utilization of radio resources used for repetitive data transmissions (e.g., as compared to allowing a single UE to use a given set of radio resources at a given time). Furthermore, delay in a transmission by a UE may be reduced (e.g., since multiple UEs may transmit more frequently).

Figure 1A:
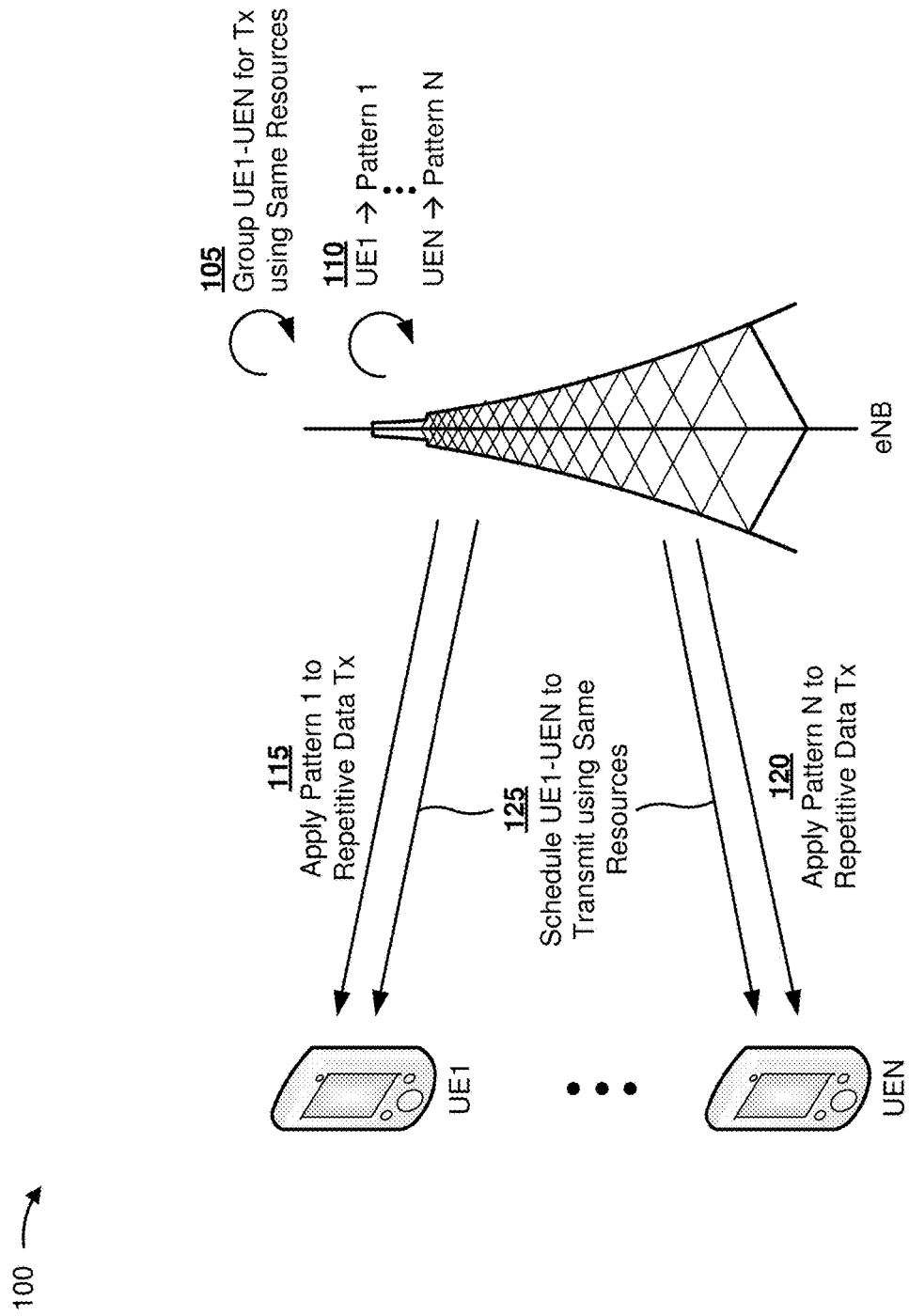
FIGS. 1A and 1B are diagrams of an overview of an example implementation described herein.
Figure 1B:
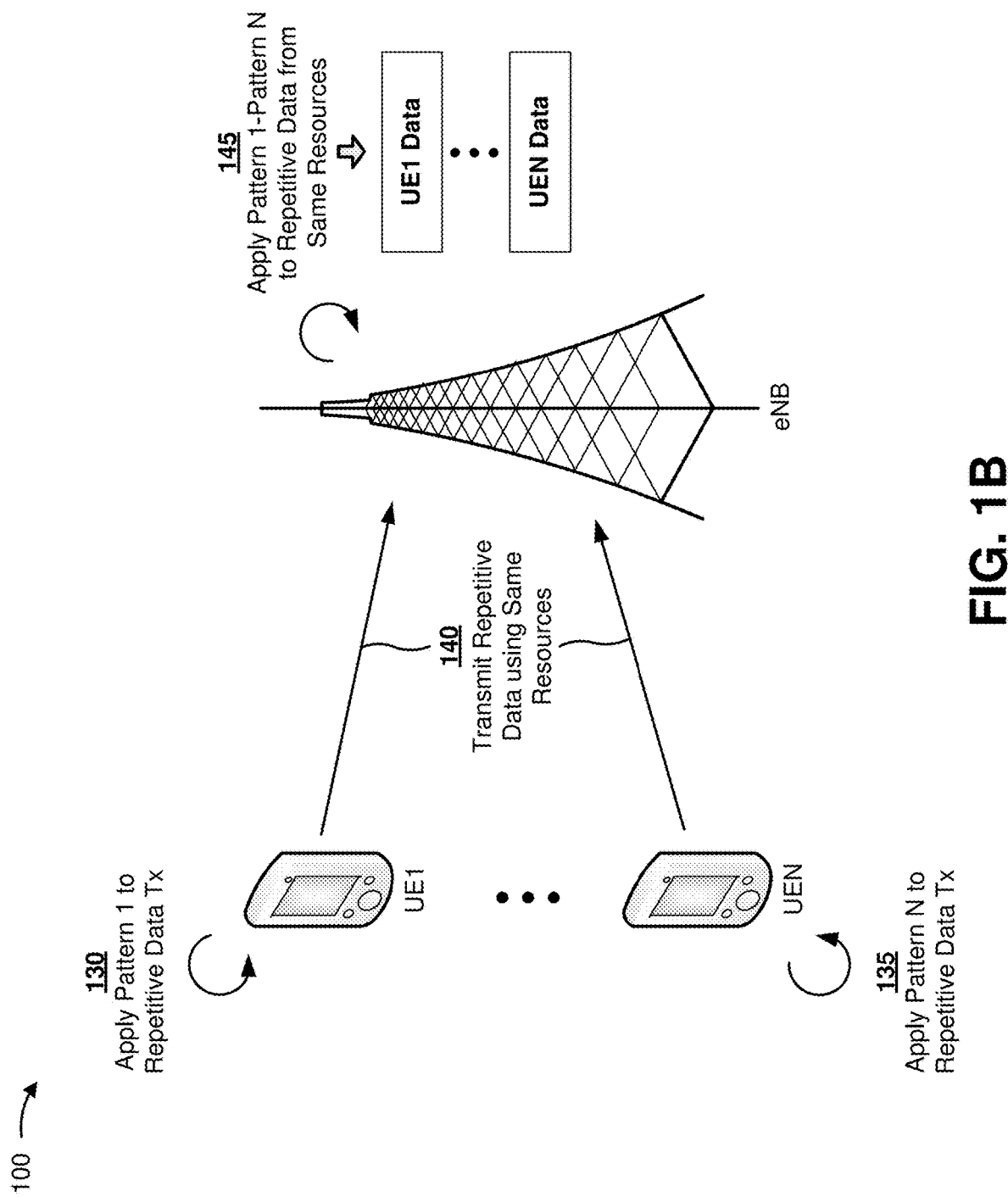

FIGS. 1A and 1B are diagrams of an overview of an example implementation 100 described herein. As shown in FIG. 1A, example implementation 100 may include a number (N, where N>1) of UEs (UE1 to UEN) and a base station, such as an eNodeB (eNB). As shown by reference number 105, the eNB may group UE1 through UEN such that UE1 through UEN may transmit repetitive data using a same set of radio resources.

As shown by reference number 110, the eNB may assign patterns (e.g., orthogonal patterns, identified as pattern 1 through pattern N) to each of UE1 through UEN. As shown by reference numbers 115 and 120, the eNB may provide, to UE1 through UEN, information that identifies a pattern to be applied by each UE. As shown by reference number 125, the eNB may then schedule UE1 through UEN to transmit repetitive data using a same set of radio resources.

As shown in FIG. 1B, and by reference number 130, UE1 may apply pattern 1 to repetitive data to be transmitted by UE1 using the set of radio resources scheduled by the eNB. Similarly, as shown by reference number 135, UEN may apply pattern N to repetitive data to be transmitted by UEN using the set of radio resources. Each of any other UEs in the group of UE1 through UEN may similarly apply an assigned pattern to repetitive data to be transmitted by that UE. As shown by reference number 140, UE1 through UEN may each transmit their respective repetitive data using the same set of radio resources (i.e., the set of radio resources scheduled by the eNB). As shown by reference number 145, eNB may receive the repetitive data in the set of radio resources, and may apply each of pattern 1 through pattern N to the repetitive data. Here, based on applying each pattern to the data received in the set of radio resources, the eNB may differentiate the repetitive data transmitted by each of UE1 through UEN, respectively.

In this way, more efficient utilization of radio resources used for repetitive data transmissions is enabled (e.g., as compared to allowing a single UE to use a given set of radio resources at a given time). Furthermore, delay in a transmission by a UE is reduced (e.g., since multiple UEs may transmit more frequently and do not need to wait for the single UE to finish transmitting).

As indicated above, FIGS. 1A and 1B are provided merely as an example. Other examples are possible and may differ from what was described with regard to FIGS. 1A and 1B.

Figure 2:
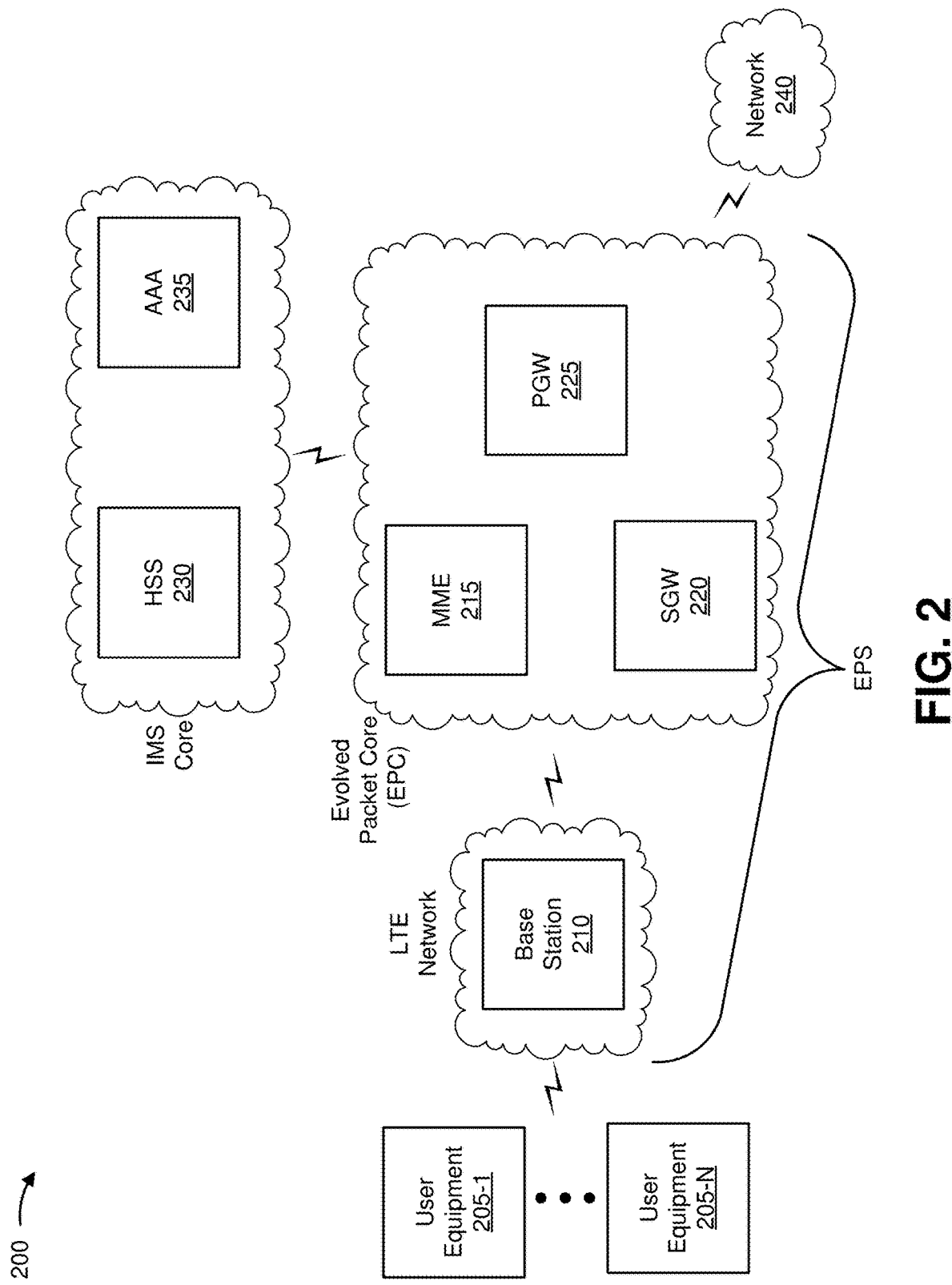
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include UEs 205-1 through 205-N (N>1); a base station 210; a mobility management entity device (MME) 215; a serving gateway (SGW) 220; a packet data network gateway (PGW) 225; a home subscriber server (HSS) 230; an authentication, authorization, and accounting server (AAA) 235; and a network 240. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which UE 205 communicates with the EPC. The EPC may include MME 215, SGW 220, and/or PGW 225 that enable UE 205 to communicate with network 240 and/or an Internet protocol (IP) multimedia subsystem (IMS) core. The IMS core may include HSS 230 and/or AAA 235, and may manage device registration and authentication, session initiation, etc., associated with UEs 205. HSS 230 and/or AAA 235 may reside in the EPC and/or the IMS core.

UE 205 includes one or more devices capable of communicating with base station 210 and/or a network (e.g., network 240). For example, UE 205 may include a mobile phone (e.g., a smart phone, a radiotelephone, etc.), a computing device (e.g., a desktop computer, a laptop computer, a tablet computer, a handheld computer, a camera, an audio recorder, a camcorder, etc.), an appliance (e.g., a refrigerator, a microwave, a stove, etc.), a medical device, a car, a light bulb, a sensor, a machine-to-machine (M2M) device, and/or any other smart device. In other words, UE 205 may be any "thing" in the IoT. In some implementations, UE 205 may send traffic to and/or receive traffic from network 240 (e.g., via base station 210, SGW 220, and/or PGW 225).

Base station 210 includes one or more devices capable of transferring traffic, such as audio, video, text, and/or other traffic, destined for and/or received from UE 205. In some implementations, base station 210 may include an eNB associated with the LTE network that receives traffic from and/or sends traffic to network 240 via SGW 220 and/or PGW 225. Additionally, or alternatively, one or more base stations 210 may be associated with a RAN that is not associated with the LTE network. Base station 210 may send traffic to and/or receive traffic from UE 205 via an air interface. In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with UE 205. In some implementations, MME 215 may perform operations relating to authentication of UE 205. Additionally, or alternatively, MME 215 may facilitate the selection of a particular SGW 220 and/or a particular PGW 225 to serve traffic to and/or from UE 205. MME 215 may perform operations associated with handing off UE 205 from a first base station 210 to a second base station 210 when UE 205 is transitioning from a first cell associated with the first base station 210 to a second cell associated with the second base station 210. Additionally, or alternatively, MME 215 may select another MME (not pictured), to which UE 205 should be handed off (e.g., when UE 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 240 (e.g., via PGW 225) and/or other network devices associated with the EPC and/or the IMS core. SGW 220 may also receive traffic from network 240 and/or other network devices, and may send the received traffic to UE 205 via base station 210. Additionally, or alternatively, SGW 220 may perform operations associated with handing off UE 205 to and/or from an LTE network.

PGW 225 includes one or more devices capable of providing connectivity for UE 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 240. Additionally, or alternatively, PGW 225 may receive traffic from network 240, and may send the traffic to UE 205 via SGW 220 and base station 210. PGW 225 may record data usage information (e.g., byte usage), and may provide the data usage information to AAA 235.

HSS 230 includes one or more devices, such as one or more server devices, capable of managing (e.g., receiving, generating, storing, processing, and/or providing) information associated with UE 205. For example, HSS 230 may manage subscription information associated with UE 205, such as information that identifies a subscriber profile of a user associated with UE 205, information that identifies services and/or applications that are accessible to UE 205, location information associated with UE 205, a network identifier (e.g., a network address) that identifies UE 205, information that identifies a treatment of UE 205 (e.g., quality of service information, a quantity of minutes allowed per time period, a quantity of data consumption allowed per time period, etc.), and/or similar information. HSS 230 may provide this information to one or more other devices of environment 200 to support the operations performed by those devices.

AAA 235 includes one or more devices, such as one or more server devices, that perform authentication, authorization, and/or accounting operations for communication sessions associated with UE 205. For example, AAA 235 may perform authentication operations for UE 205 and/or a user of UE 205 (e.g., using one or more credentials), may control access, by UE 205, to a service and/or an application (e.g., based on one or more restrictions, such as time-of-day restrictions, location restrictions, single or multiple access restrictions, read/write restrictions, etc.), may track resources consumed by UE 205 (e.g., a quantity of voice minutes consumed, a quantity of data consumed, etc.), and/or may perform similar operations.

Network 240 includes one or more wired and/or wireless networks. For example, network 240 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
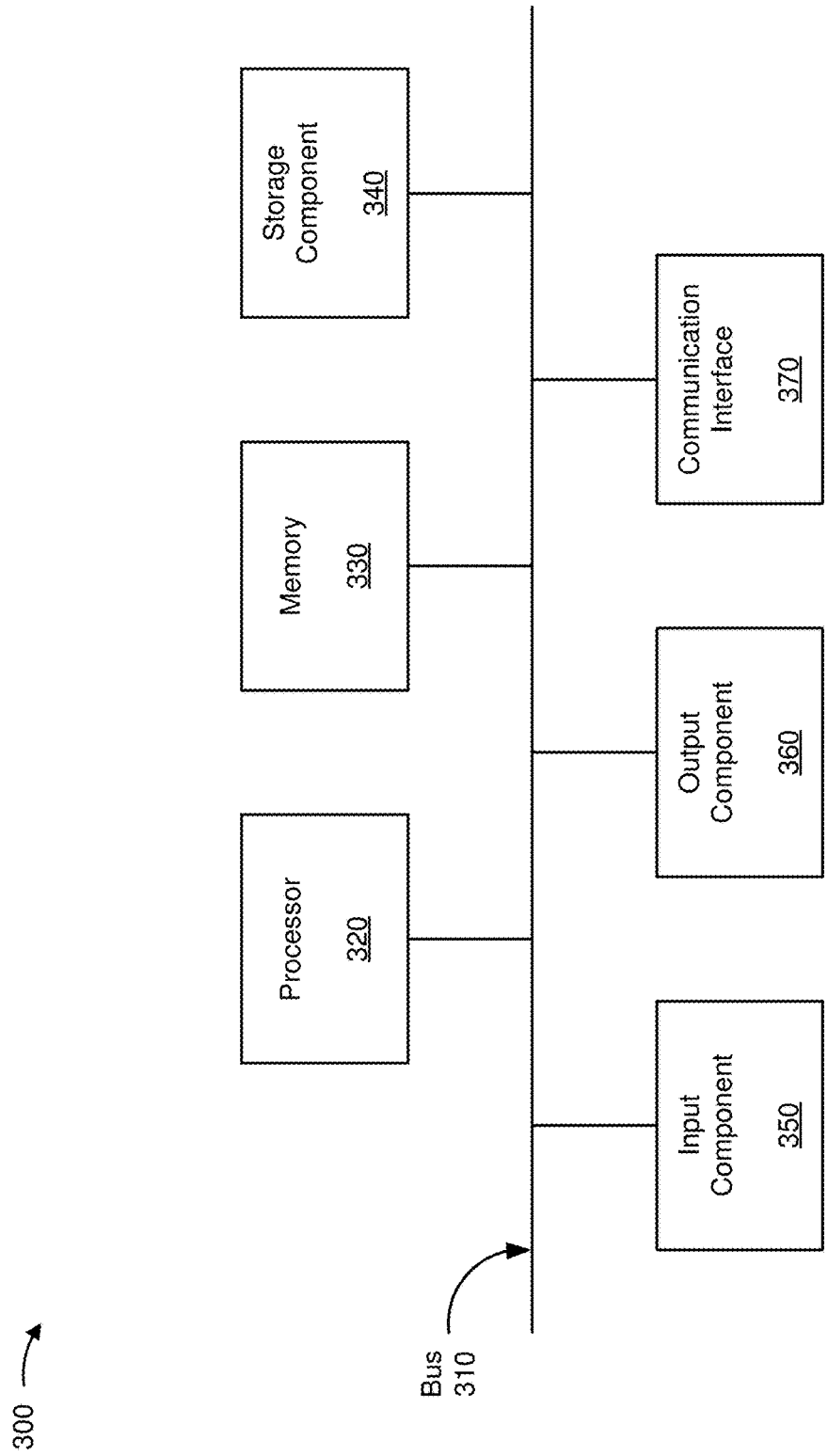
FIG. 3 is a diagram of example components of one or more devices of FIG. 2.

FIG. 3 is a diagram of example components of a device 300. Device 300 may correspond to UE 205, base station 210, MME 215, SGW 220, PGW 225, HSS 230 and/or AAA 235. In some implementations, UE 205, base station 210, MME 215, SGW 220, PGW 225, HSS 230 and/or AAA 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
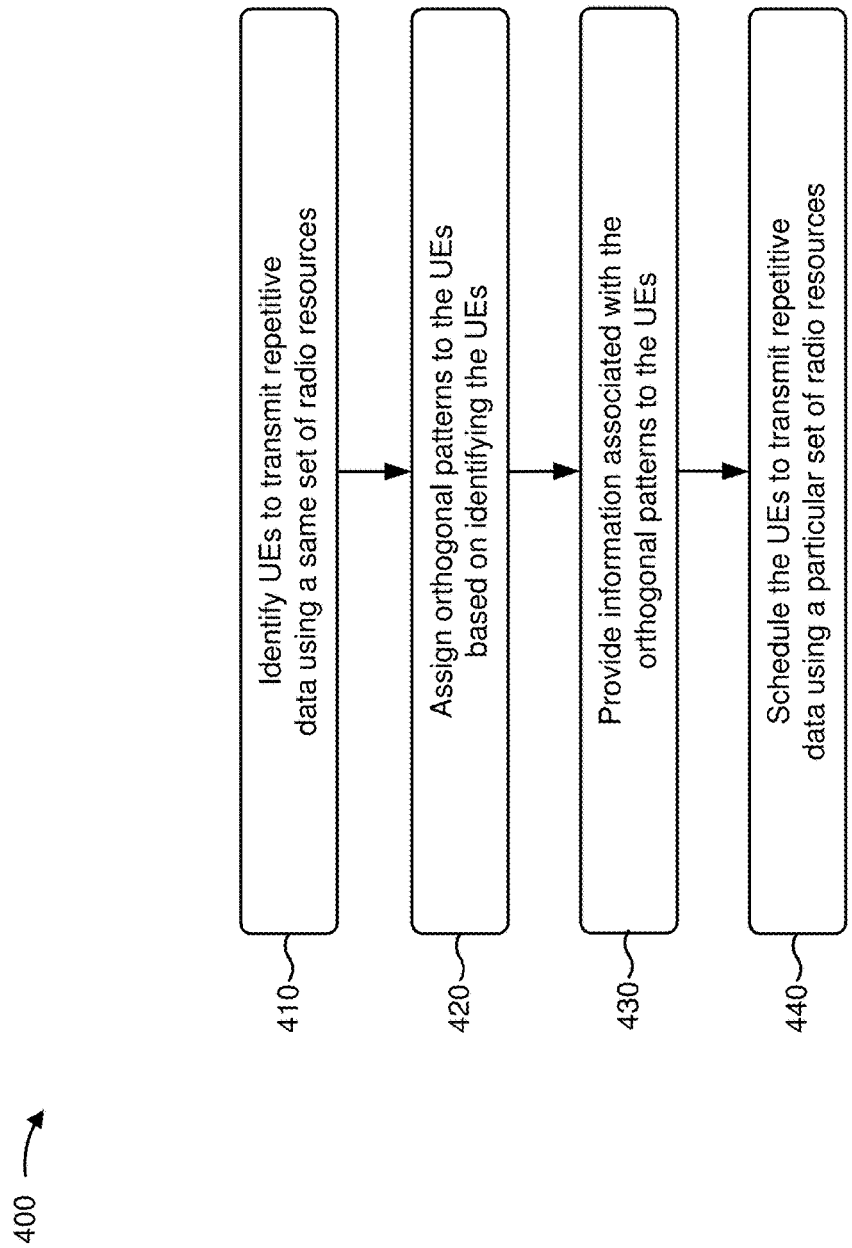
FIG. 4 is a flow chart of an example process for assigning orthogonal patterns to UEs and scheduling the UEs to transmit repetitive data using a same set of radio resources.

FIG. 4 is a flow chart of an example process 400 for assigning orthogonal patterns to UEs and scheduling the UEs to transmit repetitive data using a same set of radio resources. In some implementations, one or more process blocks of FIG. 4 may be performed by base station 210. In some implementations, one or more process blocks of FIG. 4 may be performed by another device or a group of devices separate from or including base station 210, such as MME 215, SGW 220, PGW 225, HHS 230 and/or AAA 235.

As shown in FIG. 4, process 400 may include identifying UEs to transmit repetitive data using a same set of radio resources (block 410). For example, base station 210 may identify UEs 205 to transmit repetitive data using a same set of radio resources.

In some implementations, repetitive data may include data that is transmitted multiple times by a first device for reception by a second device. For example, repetitive data may include data repeated by UE 205 to base station 210 (i.e., on the uplink) in consecutive subframes. In some implementations, repetitive data may be transmitted in order to improve coverage, as described above.

In some implementations, base station 210 may identify UEs 205 to transmit repetitive data using a same set of radio resources based on repetition times associated with UEs 205. A repetition time is an amount of time needed to transmit the repetitive data. For example, a repetition time may be 32 ms (e.g., such that a 1 ms subframe may be repeated 32 times).

In some implementations, base station 210 may determine the repetition time based on information associated with UE 205. For example, base station 210 may receive (e.g., from UE 205 during establishment of a connection between UE 205 and base station 210) information that identifies a number of times that UE 205 is to repeat data. Here, base station 210 may determine the repetition time as an amount of time needed to transmit the data the identified number of times. For example, where each repetition is one subframe in length, the repetition time matches the number of repetitions.

As another example, UE 205 may indicate, to base station 210 during establishment of a connection between UE 205 and base station 210, that UE 205 is a particular type of device and/or is associated with a particular application. Here, base station 210 may identify the repetition time based on information, accessible by base station 210, that associates repetition times with device types and/or applications. For example, in a case where UE 205 is a Voice over LTE (VoLTE) UE 205, base station 210 may determine the repetition time as 32 ms (e.g., when base station 210 stores information indicating that a VoLTE UE 205 performs 32 repetitions of data in 32 subframes).

In some implementations, base station 210 may identify the multiple UEs 205 as two or more UEs 205 with matching repetition times. For example, base station 210 may identify the multiple UEs 205 as a group of four UEs 205, each with a repetition time of 32 ms. Additionally, or alternatively, base station 210 may identify the multiple UEs 205 as two or more UEs 205 with different repetition times. For example, base station 210 may identify the multiple UEs 205 as a group of three UEs 205, where a first and second UE 205 have repetition times of 32 ms and the third UE 205 has a repetition time of 16 ms.

In some implementations, base station 210 may take channel coherence times of the UEs 205 into account when identifying the UEs 205 to transmit repetitive data using a same set of radio resources. A coherence time is a temporal interval over which a phase of a radio wave at a given point can be predicted (i.e., where a channel impulse response is substantially invariant). Here, base station 210 may identify the multiple UEs 205 based on the repetition times and the channel coherence times. For example, base station 210 may identify the multiple UEs 205 based on a channel coherence time threshold, where a particular UE 205 may be grouped when a channel coherence time of the particular UE 205 satisfies (e.g., is longer than) the channel coherence time threshold.

As a particular example, base station 210 may identify the multiple UEs 205 as a group that includes a first UE 205 with a repetition time of 32 ms and a coherence time of 4 ms, a second UE 205 with a repetition time of 32 ms and a coherence time of 8 ms, and a third UE 205 with a repetition time of 16 ms and a coherence time of 4 ms. In this example, base station 210 may exclude a fourth UE 205 of the multiple UEs 205 when, for example, the fourth UE 205 has a repetition time of 32 ms and a coherence time of 1 ms and is configured with a coherence time threshold of 4 ms or longer. In some implementations, base station 210 may identity the multiple UEs 205 based on channel coherence times in order to ensure that a set of orthogonal patterns can be applied to repetitive data transmitted by the multiple UEs 205, as described below.

As further shown in FIG. 4, process 400 may include assigning orthogonal patterns to the UEs based on identifying the UEs (block 420). For example, base station 210 may assign, orthogonal patterns to the UEs 205 based on identifying the UEs.

An orthogonal pattern includes a pattern associated with switching a sign of (i.e., inverting) symbols included in a subframe, of a sequence of subframes (herein referred to as a segment or a segment of subframes), during transmission of repetitive data. For example, an orthogonal pattern may include a pattern such as (1 1 1 1), indicating that, for a segment including four repetitions of data (e.g., a data packet repeated in four consecutive subframes), signs of symbols in each subframe are not to be inverted. As another example, an orthogonal pattern may include pattern (1 1 −1 −1), indicating that, for a segment including four repetitions, signs of symbols in the first and second subframes are not to be inverted, and signs of symbols in the third and fourth subframes are to be inverted. As another example, an orthogonal pattern may include pattern (1 −1) indicating that, for a segment including two repetitions of a subframe, signs of symbols in the first subframe are not to be inverted, and signs of symbols in the second subframe are to be inverted.

In some implementations, the orthogonal pattern may be 2, 4, 8, 16, 32, or the like, terms in length. Here, a quantity of possible orthogonal patterns depends on (e.g., is proportional to, matches, or the like) the length of the pattern. For example, when the orthogonal pattern is two terms in length, there are two possible orthogonal patterns (e.g., (1 1) and (1 −1). As another example, when the orthogonal pattern is four terms in length, there are four possible orthogonal patterns (e.g., (1 1 1 1), (1 −1 1 −1), (1 1 −1 −1), and (1 −1 −1 1)). As another example, when the orthogonal pattern is 32 terms in length, there are 32 possible orthogonal patterns. In some implementations, base station 210 may select the length of the orthogonal pattern in the manner described below. In some implementations, the use of different orthogonal patterns allows base station 210 to differentiate repetitive data transmitted by the multiple UEs 205 using a same set of radio resources, as described below.

In some implementations, base station 210 may select a length of the orthogonal pattern such that the length of the orthogonal pattern is less than or equal to a maximum common divider of the repetition times of the multiple UEs 205. For example, a group of UEs 205 may include two UEs 205 with 32 ms repetition times and a third UE 205 with a 28 ms repetition time. In this case, base station 210 selects an orthogonal pattern length of 4, because 4 is the maximum common divider of 32 and 28. Selection of the orthogonal pattern based on the maximum common divider allows base station 210 to differentiate repetitive data transmitted by the group of UEs.

Additionally, or alternatively, base station 210 may select the length of the orthogonal pattern such that the length of the orthogonal pattern is less than or equal to a smallest channel coherence time associated with the multiple UEs 205. For example, a group of UEs 205 may include three UEs 205 with 8 ms coherence times and a fourth UE 205 with a 4 ms coherence time. In this case, base station 210 selects an orthogonal pattern length of 4, because 4 ms is the smallest coherence time of the group of UEs 205. Selection of the orthogonal pattern length in this manner may further help ensure that base station 210 will be able to accurately differentiate the data provided by the multiple UEs 205.

In some implementations, base station 210 may assign a different orthogonal pattern to each UE 205. For example, base station 210 may assign different orthogonal patterns based on a Walsh code (or Hadamard code) pattern, or another type of pattern. As a particular example, base station 210 may assign, to each of 4 different UEs 205, the different orthogonal patterns (1 1 1 1), (1 1 −1 −1), (1 −1 1 −1), and (1 −1 −1 1). In some implementations, base station 210 may store information that associates each UE 205 to a corresponding orthogonal pattern.

In some implementations, base station 210 may assign orthogonal patterns of different lengths to different UEs 205, as long as orthogonality is maintained between the assigned orthogonal patterns. For example, base station 210 may assign pattern (1 −1) to a first UE 205 and may assign pattern (1 1 1 1) to a second UE 205.

As further shown in FIG. 4, process 400 may include providing information associated with the orthogonal patterns to the UEs (block 430) and scheduling the UEs to transmit repetitive data using a particular set of radio resources (block 440). For example, base station 210 may provide information associated with the orthogonal patterns to the UEs 205 and schedule the UEs 205 to transmit repetitive data using a particular set of radio resources.

In some implementations, base station 210 may provide the information to the multiple UEs 205 after base station 210 assigns the orthogonal pattern. For example, base station 210 may provide, to each UE 205, information associated with the orthogonal pattern assigned to the UE 205 after base station 210 assigns the orthogonal patterns (i.e., without scheduling a transmission by the multiple UEs 205). As a particular example, base station 210 may provide the information associated with the orthogonal pattern in downlink control information provided to UE 205.

Additionally, or alternatively, base station 210 may provide the information to the multiple UEs 205 when base station 210 schedules the UEs 205 to transmit repetitive data using a particular set of radio resources. For example, base station 210 may identify a set of radio resources to be used for the transmission of repetitive data by the multiple UEs 205. Here, base station 210 may treat the multiple UEs 205 as a single UE 205, meaning that base station 210 schedules each of the multiple UEs 205 to use a same set of radio resources for transmission. In this example, base station 210 may provide, to each UE 205, scheduling information that identifies the set of radio resources to be used for the repetitive data transmission, and information associated with the orthogonal pattern assigned to the UE 205.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
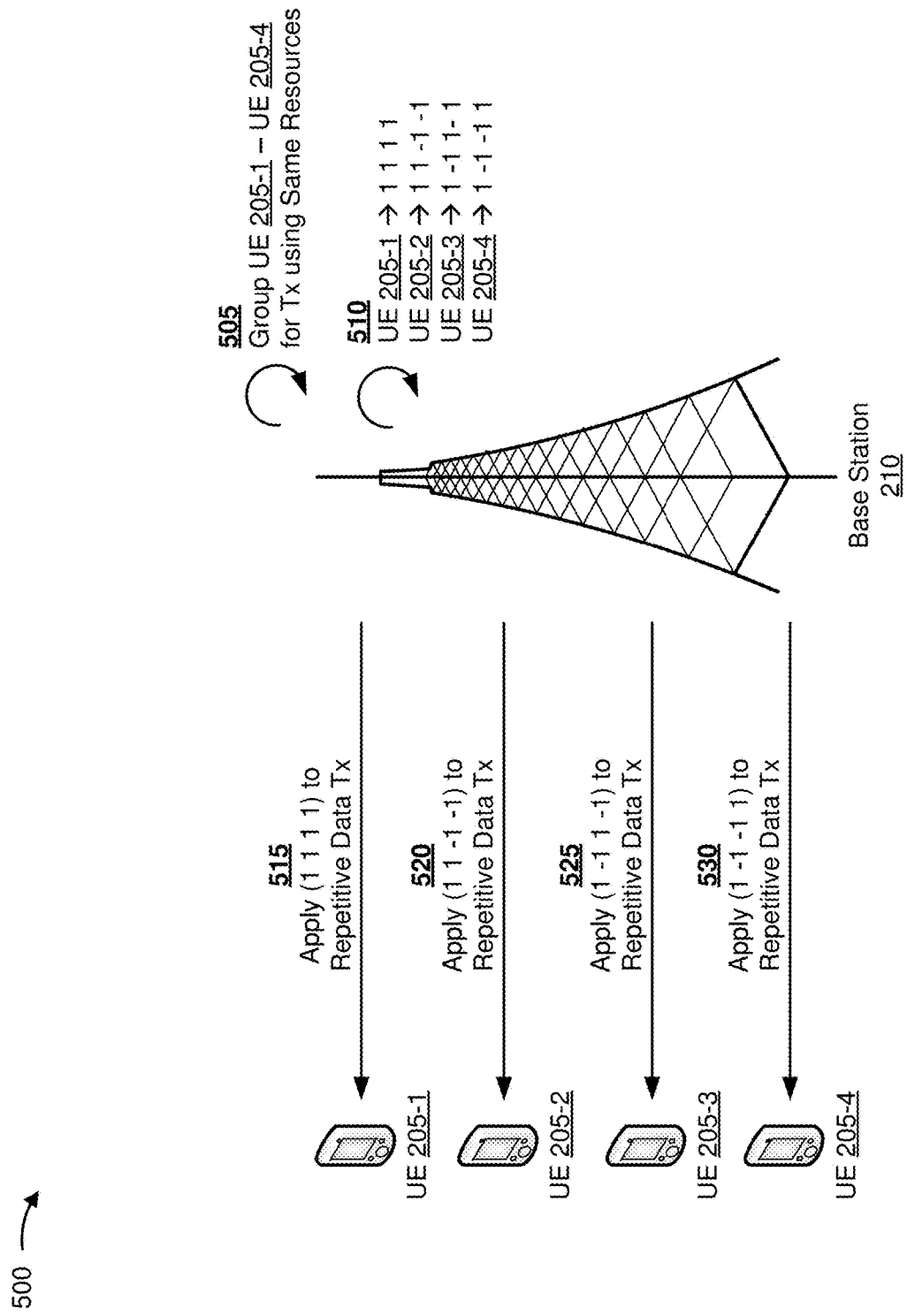
FIGS. 5A and 5B are diagrams of an example implementation relating to the example process shown in FIG. 4.
Figure 5B:
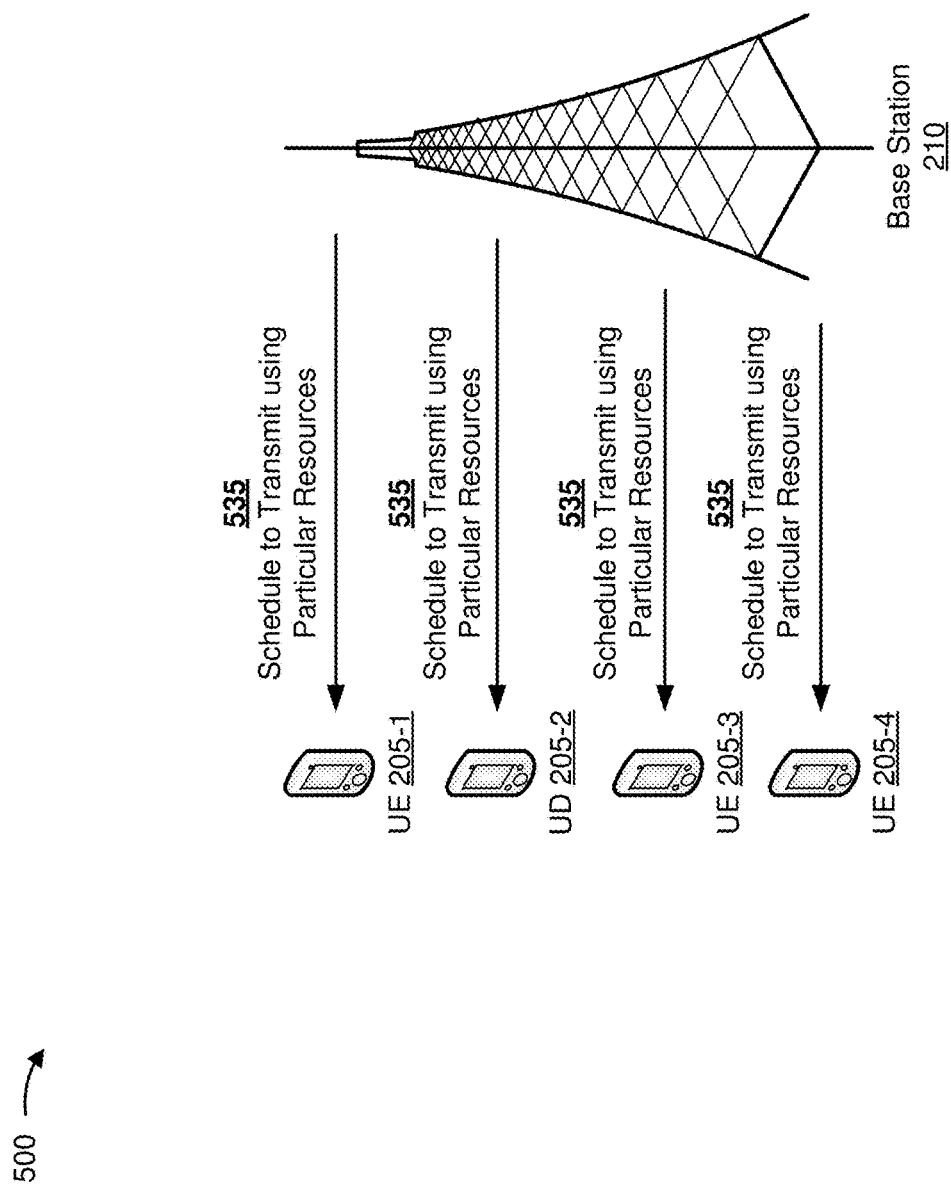

FIGS. 5A and 5B are diagrams of an example implementation 500 relating to example process 400 shown in FIG. 4. FIGS. 5A and 5B show an example of assigning orthogonal patterns to UEs and scheduling the UEs to transmit repetitive data using a same set of radio resources. As shown in FIG. 5A, example implementation 500 may include base station 210 and UEs 205-1, 205-2, 205-3, and 205-4. UEs 205-1 to 205-4 may be devices such as smartphones with high data demands or Cat-M1 or M2M devices with low data demands. As will be understood, in the case of CAT-M1 or any other M2M device there may be hundreds or thousands of deployed devices at any given time trying to access the same set of radio resources.

As shown by reference number 505, base station 210 may identify UEs 205-1 through 205-4 to transmit repetitive data using a same set of radio resources. For example, base station 210 may determine the UE 205-1 through UE 205-4 each have a repetition time of 32 ms and a channel coherence time of 4 ms, and may group UE 205-1 through UE 205-4 for transmission of repetitive data using a same set of radio resources. As shown by reference number 510, base station 210 may assign, based on identifying the UEs 205, orthogonal patterns to the UEs 205. For example, base station 210 may assign (1 1 1 1) to UE 205-1, may assign (1 1 −1 −1) to UE 205-2, may assign (1 −1 1 −1) to UE 205-3, and may assign (1 −1 −1 1) to UE 205-4. As shown by reference numbers 515, 520, 525, and 530, base station 210 may provide, to UE 205-1 through UE 205-4, information that identifies the orthogonal pattern to be applied to repetitive data by each UE 205.

As shown in FIG. 5B, base station 210 may schedule the UEs 205 to transmit repetitive data using a particular set of radio resources. For example, as shown by reference number 535, base station 210 may schedule UE 205-1, UE 205-2, UE 205-3, and UE 205-4 to transmit repetitive data using a particular set of radio resources.

As indicated above, FIGS. 5A and 5B are provided merely as an example. Other examples are possible and may differ from what was described with regard to FIGS. 5A and 5B.

Figure 6:
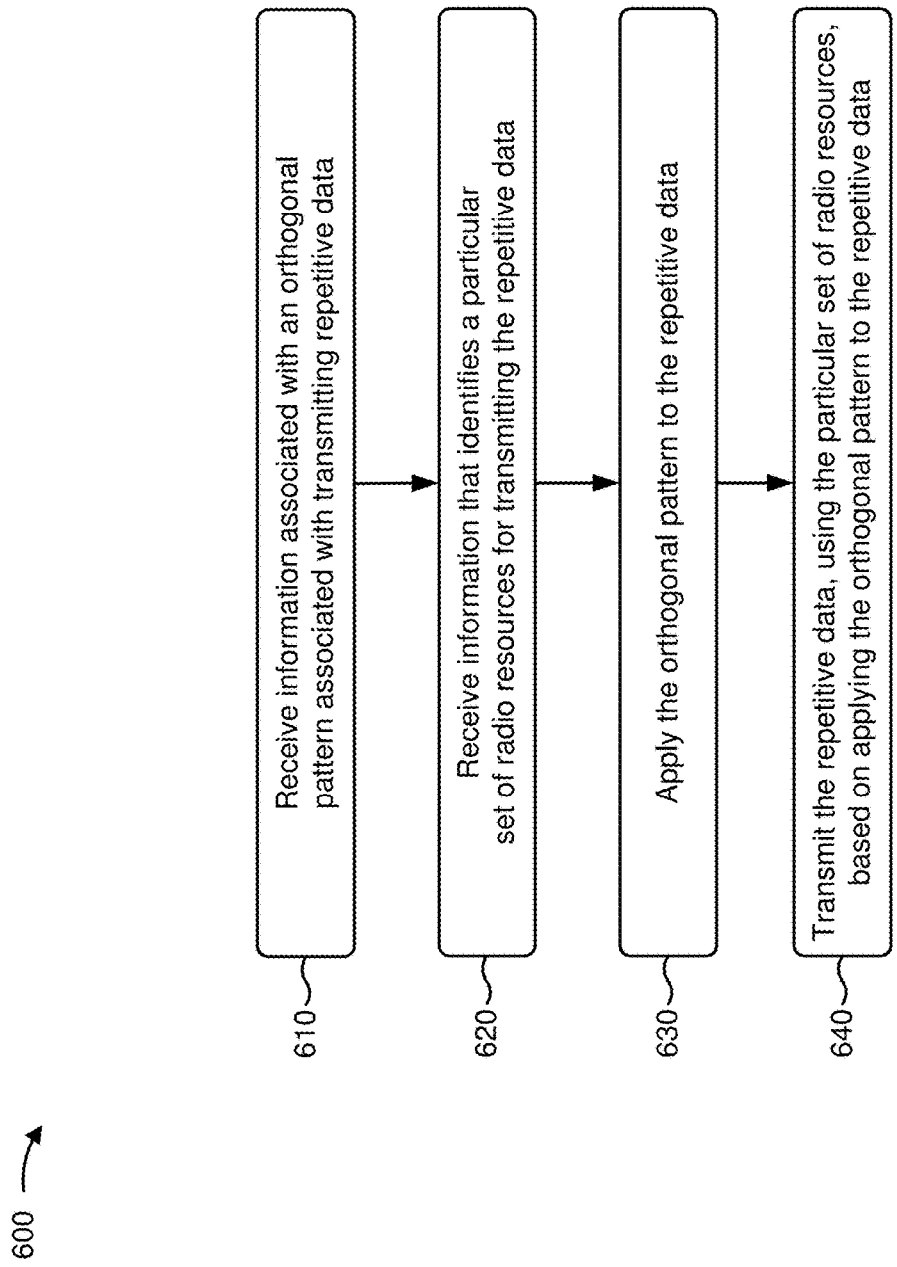
FIG. 6 is a flow chart of an example process for applying an orthogonal pattern to repetitive data, and transmitting the repetitive data using a particular set of radio resources.

FIG. 6 is a flow chart of an example process 600 for applying an orthogonal pattern to repetitive data, and transmitting the repetitive data using a particular set of radio resources. In some implementations, one or more process blocks of FIG. 6 may be performed by UE 205.

As shown in FIG. 6, process 600 may include receiving information associated with an orthogonal pattern associated with transmitting repetitive data (block 610). For example, UE 205 may receive information associated with an orthogonal pattern associated with transmitting repetitive data.

In some implementations, UE 205 may receive the information associated with the orthogonal pattern when base station 210 provides the information associated with the orthogonal pattern. In some implementations, UE 205 may store information associated with the orthogonal pattern such that UE 205 may apply the orthogonal pattern to repetitive data, as described below.

As further shown in FIG. 6, process 600 may include receiving information that identifies a particular set of radio resources for transmitting the repetitive data (block 620). For example, UE 205 may receive information that identifies a particular set of radio resources for transmitting repetitive data.

In some implementations, UE 205 may receive the information when base station 210 provides the scheduling information that identifies the particular set of radio resources to use for a repetitive data transmission. In this case, other UEs 205, of the multiple UEs 205, may receive similar scheduling information.

As further shown in FIG. 6, process 600 may include applying the orthogonal pattern to the repetitive data (block 630). For example, UE 205 may apply the orthogonal pattern to the repetitive data.

In some implementations, UE 205 may apply the orthogonal pattern when preparing to transmit the repetitive data using the particular set of radio resources. For example, UE 205 may encode the data, perform rate matching, and generate symbols corresponding to the encoded data, in a typical manner. UE 205 may then apply the orthogonal pattern to the symbols. After applying the orthogonal pattern to the symbols, UE 205 may map the symbols for transmission using the radio resources, as usual.

In some implementations, UE 205 may apply the orthogonal pattern such that symbols, included in subframes of repetitive data, are inverted according to the orthogonal pattern. For example, UE 205 may be assigned orthogonal pattern (1 −1 −1 1). Here, a segment comprises 4 subframes. In each subframe of the segment, each symbol is inverted, where indicated. For example, in this case, symbols in the second and third subframes are inverted, while symbols in the first and fourth subframes are not inverted.

UE 205 may apply orthogonal patterns in a similar manner for each segment. For example, assume that for 32 repetitions, there are 8 segments, each having 4 subframes. In this case, the symbols in the subframes of each segment are inverted according to the orthogonal pattern. Here, each UE 205, of the multiple UEs 205, applies a corresponding assigned orthogonal pattern to the repetitive data to be transmitted in the particular set of radio resources. As explained above, the orthogonal pattern may be different for each UE.

As further shown in FIG. 6, process 600 may include transmitting the repetitive data, using the particular set of radio resources, based on applying the orthogonal pattern to the repetitive data (block 640). For example, UE 205 may transmit the repetitive data, using the particular set of radio resources, based on applying the orthogonal pattern to the repetitive data.

In some implementations, UE 205 may transmit the repetitive data using the particular set of radio resources after applying the orthogonal pattern, as described above. In this way, each UE 205, of the multiple UEs 205, may transmit respective repetitive data using the particular set of radio resources (e.g., such that the multiple UEs 205 concurrently transmit repetitive data using the same set of radio resources). This may improve efficiency in usage of radio resources, as well as reduce transmission delay time associated with a given UE 205.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
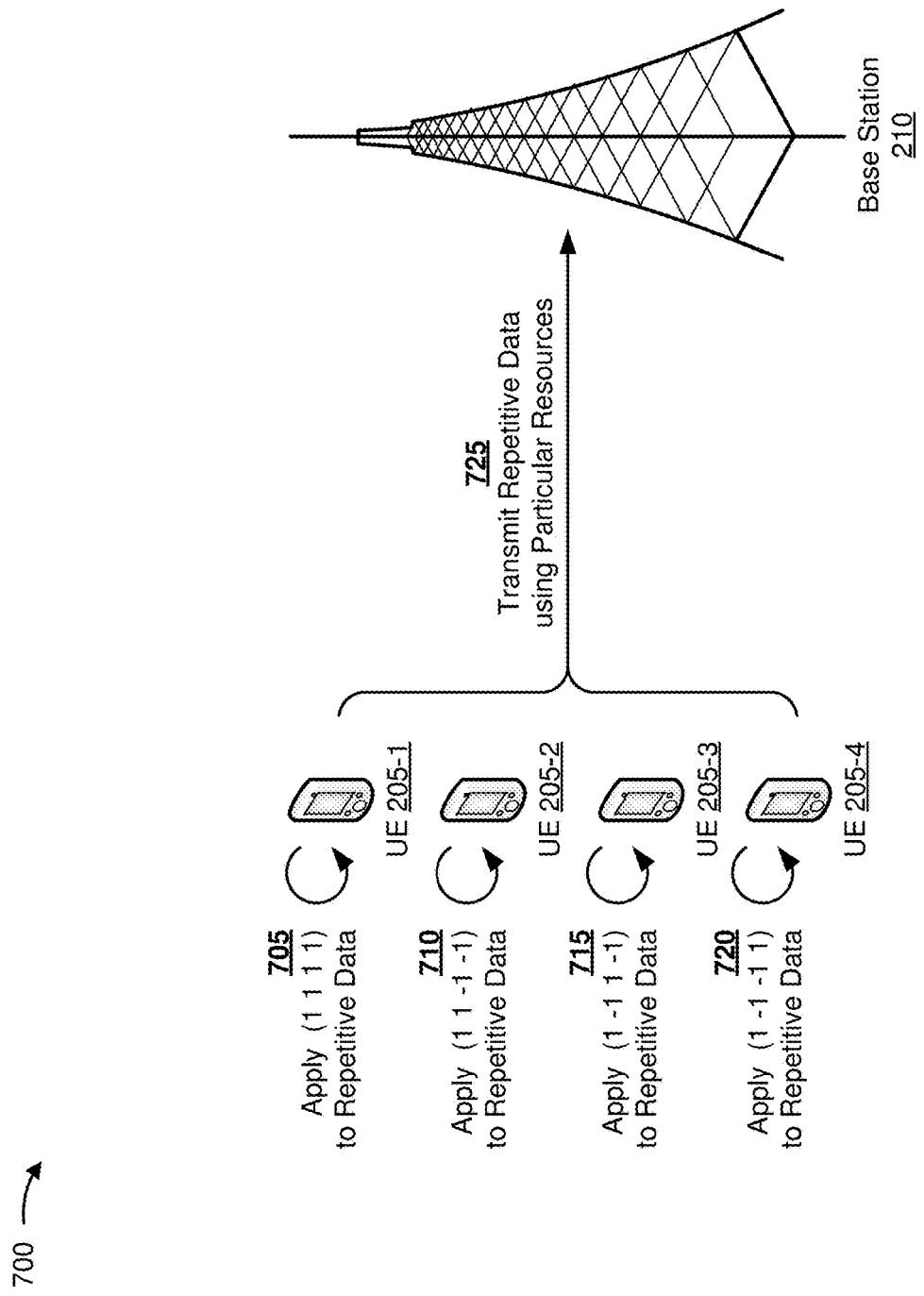
Figure 7B:
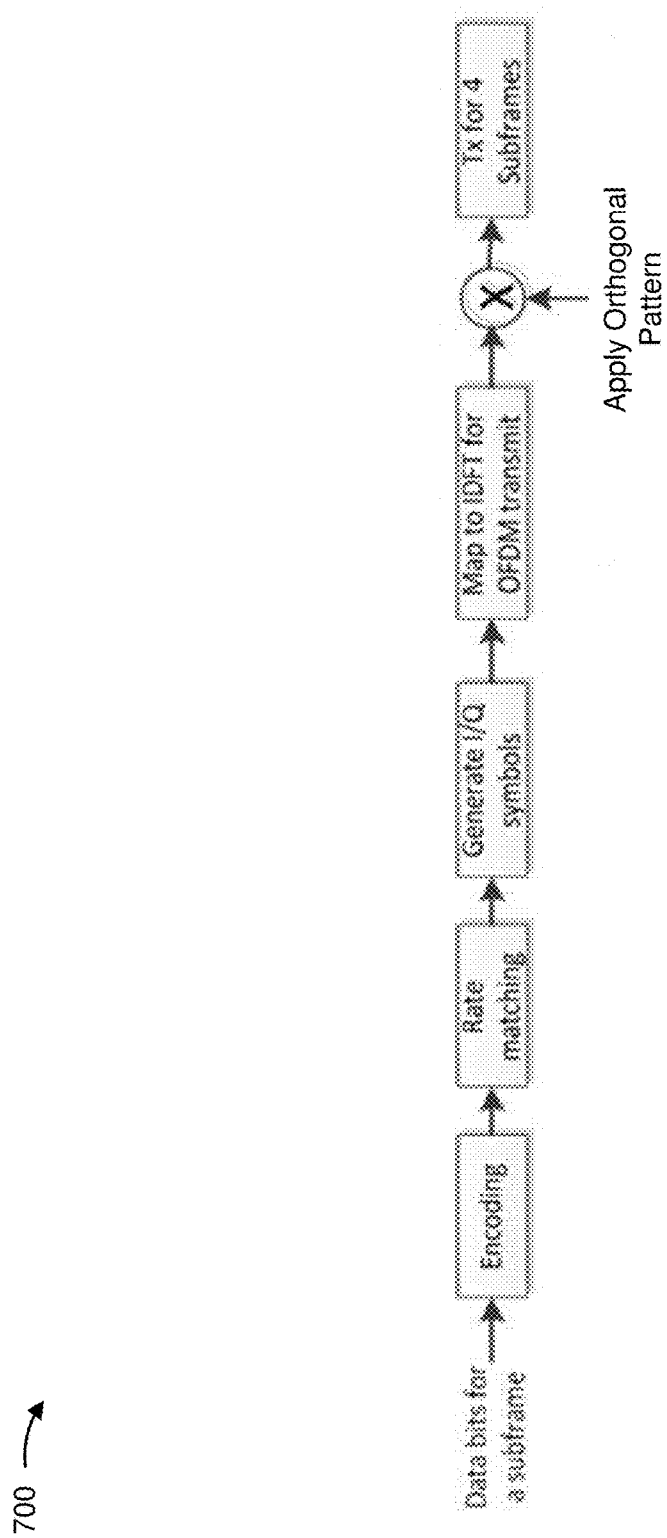
Figure 7C:
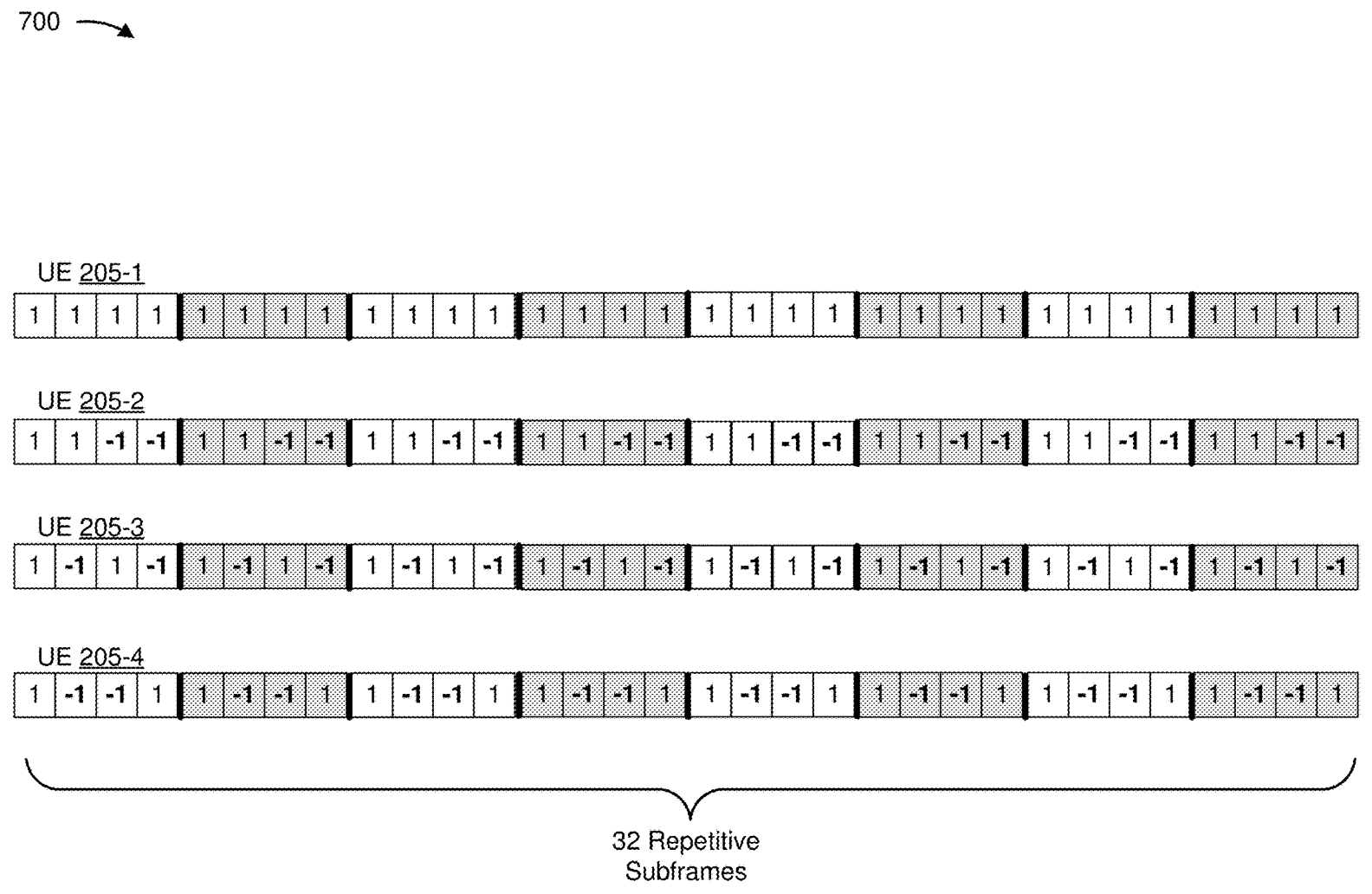

FIGS. 7A-7C are diagrams of an example implementation 700 relating to example process 600 shown in FIG. 6. FIGS. 7A-7C show an example of applying an orthogonal pattern to repetitive data and transmitting the repetitive data using a particular set of radio resources.

As shown in FIG. 7A, example implementation 700 may include UEs 205 and base station 210. As shown by reference numbers 705, 710, 715, and 720, each of UE 205-1 through 205-4 may apply an assigned orthogonal pattern to repetitive data. For example, as shown by reference number 705, UE 205-1 may apply (1 1 1 1) to the repetitive data. Similarly, as shown by reference number 710, UE 205-2 may apply (1 1 −1 −1) to the repetitive data. Similarly, as shown by reference number 715, UE 205-3 may apply (1 −1 1 −1) to the repetitive data. Similarly, as shown by reference number 720, UE 205-4 may apply (1 −1 −1 1) to the repetitive data. As shown by reference number 725, UE 205 through 205-4 may transmit the repetitive data, using the particular (i.e., same) set of radio resources.

As shown in FIG. 7B, in transmitting the data bits of a subframe, UE 205 may encode the data, may perform rate matching, and may generate symbols corresponding to the encoded data, as shown. UE 205 may then apply the orthogonal pattern to the generated symbols. After applying the orthogonal pattern to the symbols, UE 205 may map the symbols for transmission using the radio resources, as described above.

FIG. 7C is an illustrative example of how the orthogonal patterns may be applied to the repetitive data. Here, each block represents a subframe with a 1 PRB width. As shown in FIG. 7C, in transmitting 32 repetitive subframes, each UE 205 may apply a different orthogonal pattern. For example, UE 205-1 may apply orthogonal pattern (1 1 1 1) to each segment of 4 subframes. Similarly, UE 205-2 may apply the orthogonal pattern (1 1 −1 −1) to each segment. Similarly, UE 205-3 may apply the orthogonal pattern (1 −1 1 −1) to each segment. Similarly, UE 205-4 may apply the orthogonal pattern (1 −1 −1 1) to each segment.

As indicated above, FIGS. 7A-7C are provided merely as an example. Other examples are possible and may differ from what was described with regard to FIGS. 7A-7C.

Figure 8:
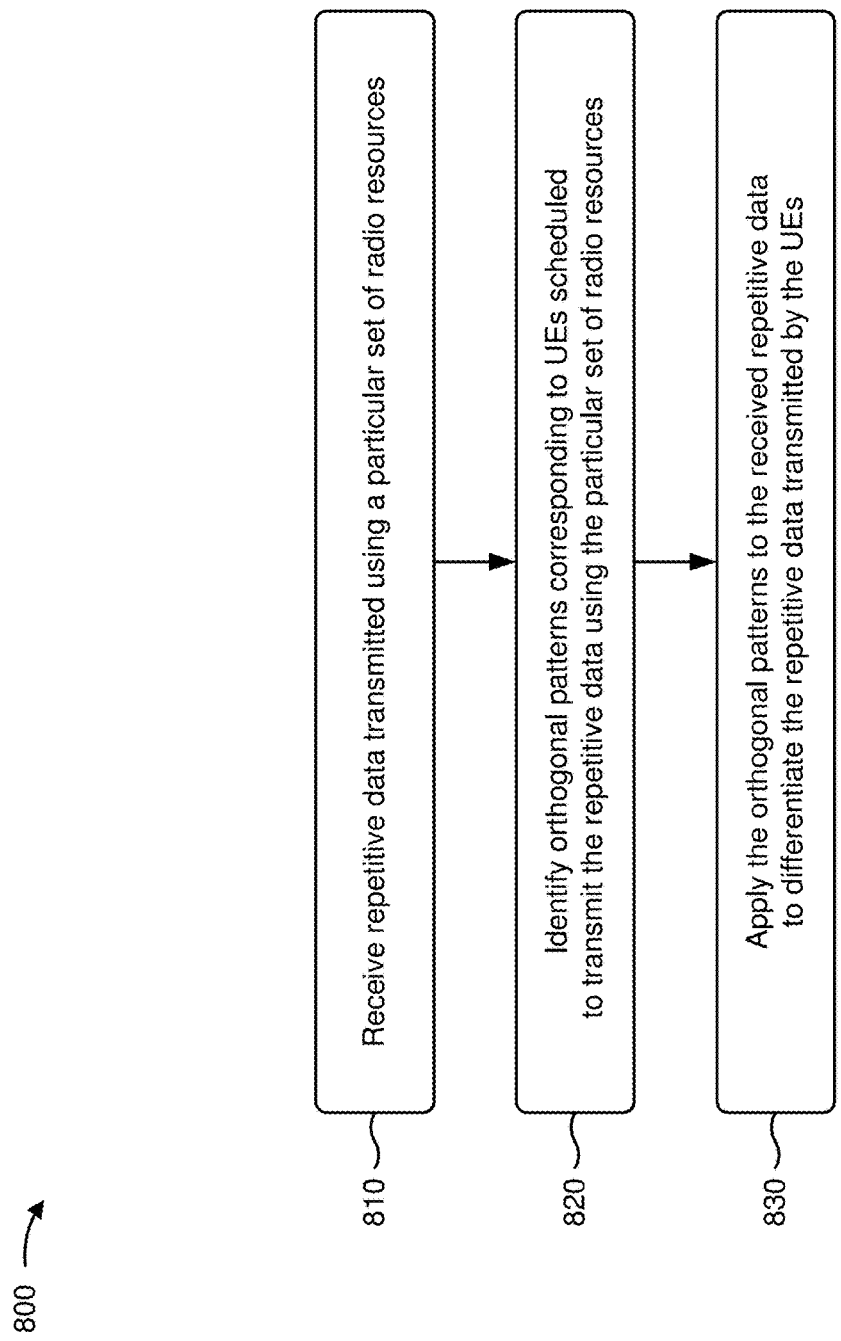
FIG. 8 is a flow chart of an example process for applying assigned orthogonal patterns to received repetitive data, associated with multiple UEs, to differentiate repetitive data transmitted by the multiple UEs using a particular set of radio resources.

FIG. 8 is a flow chart of an example process 800 for applying assigned orthogonal patterns to received repetitive data, associated with multiple UEs, to differentiate repetitive data transmitted by the multiple UEs using a particular set of radio resources. In some implementations, one or more process blocks of FIG. 8 may be performed by base station 210. In some implementations, one or more process blocks of FIG. 8 may be performed by another device or a group of devices separate from or including base station 210, such as MME 215, SGW 220, PGW 225, HHS 230 and/or AAA 235.

As shown in FIG. 8, process 800 may include receiving repetitive data transmitted using a particular set of radio resources (block 810). For example, base station 210 may receive repetitive data transmitted using a particular set of radio resources.

In some implementations, the repetitive data may include data transmitted by the multiple UEs 205. In some implementations, base station 210 may receive the repetitive data when the multiple UEs 205 transmit respective data using the particular set of radio resources, as described above.

As further shown in FIG. 8, process 800 may include identifying orthogonal patterns corresponding to UEs scheduled to transmit repetitive data using the particular set of radio resources (block 820). For example, base station 210 may identify orthogonal patterns corresponding to UEs 205 scheduled to transmit repetitive data using the particular set of radio resources.

In some implementations, base station 210 may identify the orthogonal patterns based on information, stored by base station 210, based on assigning the orthogonal patterns, as described above. In some implementations, base station 210 may identify the orthogonal patterns based on information that identifies the multiple UEs 205 scheduled to transmit using the particular set of radio resources. In some implementations, base station 210 may use identifiers, associated with the multiple UEs 205, to identifying the orthogonal patterns (e.g., when base station 210 stores information that associates each of the multiple UEs 205 with a corresponding orthogonal pattern).

As further shown in FIG. 8, process 800 may include applying the orthogonal patterns to the received repetitive data to differentiate the repetitive data transmitted by the UEs using the particular set of radio resources (block 830). For example, base station 210 may apply the orthogonal patterns to the received repetitive data to differentiate the repetitive data transmitted by the UEs 205 using the particular set of radio resources.

In some implementations, base station 210 may apply the orthogonal pattern based on receiving the repetitive data in the particular set of radio resources. For example, base station 210 may receive radio signals associated with the particular set of radio resources and extract symbols from the radio signals. Base station 210 may then apply each of the orthogonal patterns to the symbols (i.e., base station 210 may apply each orthogonal pattern to a different copy of the symbols), and accumulate symbols, associated with each segment, for each orthogonal pattern. Here, after applying the orthogonal patterns and accumulating the symbols, base station 210 may continue with channel estimation, symbol combining, rate de-matching, and decoding of the data (e.g., for each UE 205).

In some implementations, base station 210 may apply the orthogonal pattern such that symbols, included in subframes of repetitive data, are inverted according to the orthogonal pattern. For example, base station 210 may apply orthogonal pattern (1 −1 −1 1) associated with a particular UE 205. Here, assume that a segment comprises 4 subframes. In each subframe of the segment, base station 210 inverts symbols as indicated. In this case, symbols in the second and third subframes are inverted, while symbols in first and fourth subframes are not inverted. This effectively undoes the inverting of symbols previously performed by UE 205. Here, base station 210 accumulates symbols for each segment, which removes interference of other data transmitted by other UEs 205. In this way, base station 210 differentiates the repetitive data associated with each of the multiple UEs 205.

Base station 210 may apply the orthogonal patterns in a similar manner for each segment. For example, assume that for 32 repetitions, there are 8 segments, each having 4 subframes. In this case, base station 210 inverts the symbols according to the pattern and does 8 accumulations of the symbols (one for each segment), before proceeding as usual. Base station 210 may apply orthogonal patterns, each corresponding to a different UE 205 of the multiple UEs 205, to the received symbols. Here, base station 210 applies each assigned orthogonal pattern to the repetitive data in order to differentiate the repetitive data transmitted by the multiple UEs 205.

In some implementations, after applying the orthogonal patterns, base station 210 may determine data (e.g., packets of data) repeated by each UE 205 in the corresponding repetitive data transmissions. In this way, base station 210 may receive and differentiate multiple items of repetitive data, transmitted by multiple UEs 205, in a same set of radio resources, while still achieving improved coverage (through data repetition). In some implementations, after determining the data repeated by each UE, base station 210 may output and/or provide the data associated with each UE 205.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
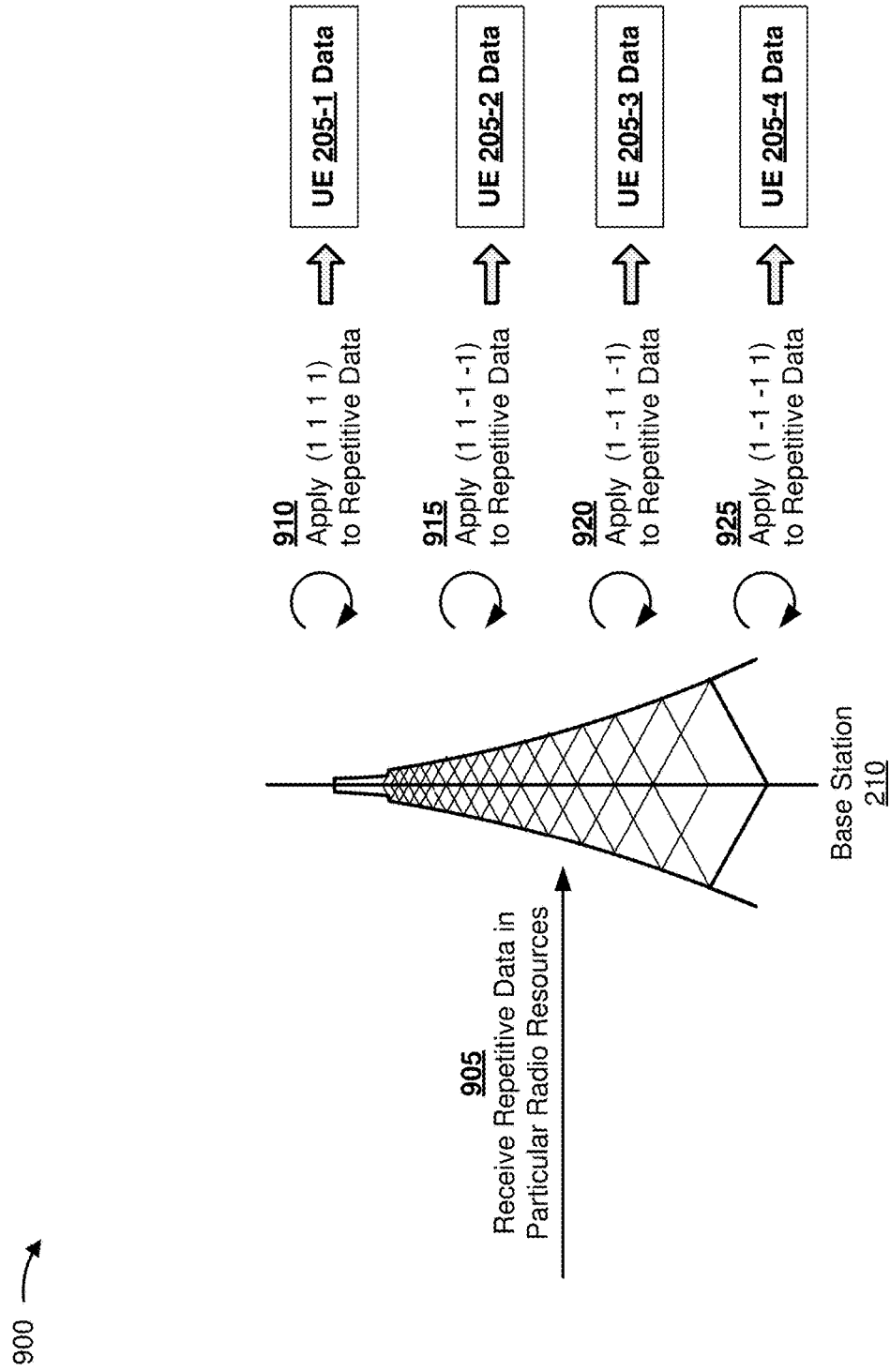
FIGS. 9A and 9B are diagrams of an example implementation relating to the example process shown in FIG. 8.
Figure 9B:
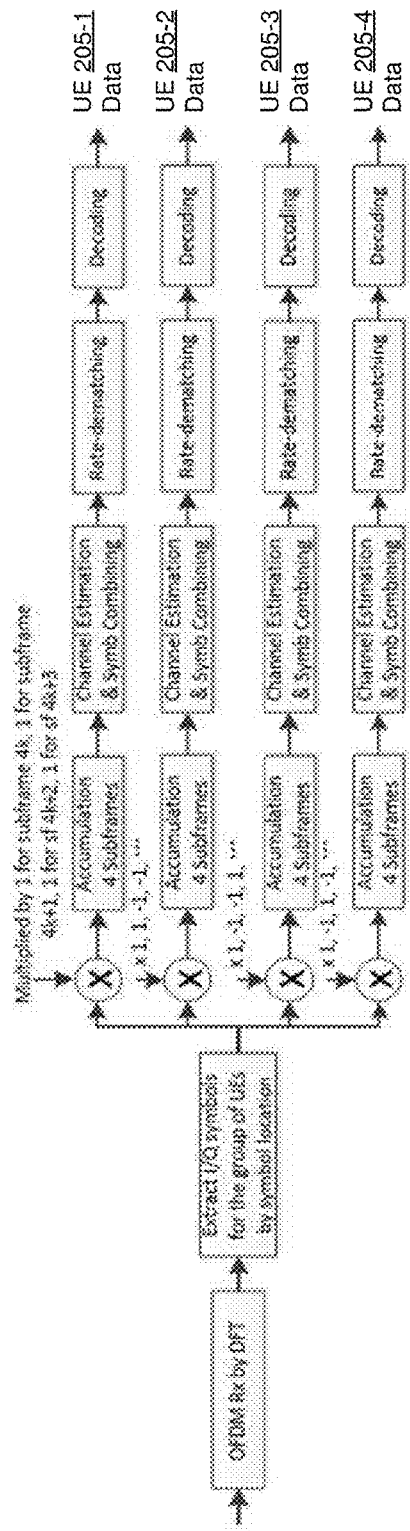

FIGS. 9A and 9B are diagrams of an example implementation 900 relating to example process 800 shown in FIG. 8. FIGS. 9A and 9B show an example of applying assigned orthogonal patterns to received repetitive data, associated with multiple UEs, to differentiate repetitive data transmitted by the multiple UEs using a particular set of radio resources.

As shown in FIG. 9A, example implementation 900 includes base station 210. As shown by reference number 905, base station 210 may receive repetitive data transmitted using a particular set of radio resources. As shown by reference numbers 910 through 925, base station 210 may apply the orthogonal patterns to the received repetitive data to differentiate the repetitive data transmitted by the UEs 205 using the particular set of radio resources. For example, as shown by reference number 910, base station 210 may apply (1 1 1 1) to the received repetitive data to differentiate the UE 205-1 data. Similarly, as shown by reference number 915, base station 210 may apply (1 1 −1 −1) to the received repetitive data to differentiate the UE 205-2 data. Similarly, as shown by reference number 920, base station 210 may apply (1 −1 1 −1) to the received repetitive data to differentiate the UE 205-3 data. Similarly, as shown by reference number 925, base station 210 may apply (1 −1 −1 1) to the received repetitive data to differentiate the UE 205-4 data. As shown, base station 210 may then provide the data transmitted by UEs 205-1 through 205-4, as needed.

FIG. 9B is an illustrative example of a manner in which base station 210 may process the received repetitive data. As shown in FIG. 9B, base station 210 may receive radio signals associated with the particular set of radio resources, and may extract symbols from the radio signals, as shown. Base station 210 may then apply each of the orthogonal patterns to the symbols (e.g., to different copies of the symbols), and may accumulate symbols, associated with each segment (e.g., each group of 4 subframes) for each orthogonal pattern. After applying the orthogonal patterns and accumulating the symbols, base station 210 may perform channel estimation, symbol combining, rate de-matching, and decoding, for each UE 205, as shown. At this point, base station 210 has differentiated the data transmitted by each of UE 205-1 through UE 205-4.

As indicated above, FIGS. 9A and 9B are provided merely as an example. Other examples are possible and may differ from what was described with regard to FIGS. 9A and 9B.

Implementations described herein may provide for channel multiplexing that allows a base station to receive and decode repetitive data transmissions from multiple UEs that use the same set of radio resources to transmit the repetitive data. This allows more efficient utilization of radio resources used for repetitive data transmissions (e.g., as compared to allowing a single UE to use a given set of radio resources at a given time). Furthermore, delay in a transmission by a UE may be reduced (e.g., since multiple UEs may transmit more frequently).

In this way, uplink capacity is increased. For example, some implementations may provide up to $2^n$ times more efficiency in uplink resource usage, leading to a $2^n$ increase in capacity, where n is an integer chosen by base station 210 (e.g., based on repetition times and/or channel coherency of UEs 205). For example, $2^n$ may be a length of a Walsh code. Here, if base station 210 chooses the Walsh code to be 32 bits long, then up to 32 UEs 205 may be multiplexed together sharing the same radio resources. In this case, n is equal to 5 (e.g., $2^5=32$).

Furthermore, capacity advantages are provided without impacting coverage or requiring base station 210 to perform additional process intensive steps (e.g., there is no duplication of discrete Fourier transformation by base station 210).

The foregoing disclosure provides illustration and description, but is not intended to be exhaustive or to limit the implementations to the precise form disclosed. Modifications and variations are possible in light of the above disclosure or may be acquired from practice of the implementations.

For example, while implementations described herein are described in the context of a relatively small number of UEs (e.g., four UEs), in some implementations, the techniques described herein may be applied to a relatively large number of UEs, such as a relatively large number (e.g., 30, 60, 100, or the like) of IoT devices. Here, each of the IoT devices may have a relatively low data demand, but may have a simultaneous or near-simultaneous access time and/or wake-up time at which the IoT devices are to transmit repetitive data. In such a case, the above described techniques may be applied in order to efficiently and effectively allow the IoT devices to use the same set of radio resources to simultaneously transmit their respective repetitive data.

As another example, while implementations described herein are described in the context of uplink channel multiplexing, in some implementations, similar techniques may be applied to downlink channel multiplexing. In such a case, base station 210 may transmit different data to multiple UEs using a same set of radio resources. This may permit a voice activity factor to be taken advantage of (e.g., since otherwise downlink radio resource may be still allocated even if there is no downlink traffic) and/or may allow power control to be taken advantage of such that an amount of transmission power used is reduced (e.g., as compared to transmitting to each UE individually using different radio resources).

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A base station, comprising:
    a memory; and
    one or more processors to:
        receive repetitive data transmitted using a particular set of radio resources,
            the repetitive data including first repetitive data being transmitted multiple times in consecutive segments by a first user equipment (UE) while second repetitive data is transmitted multiple times in consecutive segments by a second UE;
        apply a first orthogonal pattern, assigned to the first UE, to each consecutive segment of subframes of the repetitive data such that at least one symbol in the subframes of each segment is inverted according to the first orthogonal pattern;
        apply a second orthogonal pattern, assigned to the second UE, to each consecutive segment of subframes of the repetitive data such that at least one other symbol in the subframes of each segment is inverted according to the second orthogonal pattern, the second orthogonal pattern being different from the first orthogonal pattern;
        determine the first repetitive data, transmitted by the first UE using the particular set of radio resources, based on applying the first orthogonal pattern to each segment of subframes of the repetitive data; and
        determine the second repetitive data, concurrently transmitted by the second UE using the particular set of radio resources, based on applying the second orthogonal pattern to each segment of subframes of the repetitive data.

2. The base station of claim 1, where the one or more processors are further to:
    identify the first UE and the second UE as UEs to transmit the repetitive data using a same set of radio resources; and
    assign the first orthogonal pattern to the first UE and the second orthogonal pattern to the second UE based on identifying the first UE and the second UE as UEs to transmit the repetitive data using the same set of radio resources.

3. The base station of claim 2, where the one or more processors are further to:
    determine a first repetition time, associated with the first UE, and a second repetition time associated with the second UE; and
    where the one or more processors, when identifying the first UE and the second UE as UEs to transmit the repetitive data using the same set of radio resources, are to:
        identify the first UE and the second UE as UEs to transmit the repetitive data using the same set of radio resources based on the first repetition time and the second repetition time.

4. The base station of claim 2, where the one or more processors are further to:
    provide information associated with the first orthogonal pattern to the first UE based on assigning the first orthogonal pattern to the first UE; and provide information associated with the second orthogonal pattern to the second UE based on assigning the second orthogonal pattern to the second UE.

5. The base station of claim 1, where the one or more processors are further to:
schedule the first UE to transmit the first repetitive data and the second UE to transmit the second repetitive data using the particular set of radio resources.

6. The base station of claim 1, where the one or more processors, when applying the first orthogonal pattern to the segment of subframes of the repetitive data, are to:
selectively invert symbols in a subframe, of the segment of subframes, in accordance with the first orthogonal pattern.

7. The base station of claim 1, where the one or more processors are further to:
identify the first orthogonal pattern, assigned to the first UE, and the second orthogonal pattern, assigned to the second UE, based on receiving the repetitive data transmitted using the particular set of radio resources.

8. A non-transitory computer-readable medium storing instructions, the instructions comprising:
one or more instructions that, when executed by one or more processors, cause the one or more processors to:
receive repetitive data transmitted using a particular set of radio resources,
the repetitive data including first repetitive data being transmitted multiple times in consecutive segments by a first user equipment (UE) while second repetitive data is transmitted multiple times in consecutive segments by a second UE;
apply a plurality of orthogonal patterns, assigned to a corresponding plurality of UEs, to each consecutive segments of subframes of the repetitive data,
the plurality of UEs including the first UE and the second UE,
where the instructions, that cause the one or more processors to apply the plurality of orthogonal patterns, further cause the one or more processors to:
apply a first orthogonal pattern, assigned to the first UE, to each consecutive segment of subframes of the repetitive data such that at least one symbol in the subframes of each segment is inverted according to the first orthogonal pattern, and
apply a second orthogonal pattern, assigned to the second UE, to each consecutive segment of subframes of the repetitive data such that at least one other symbol in the subframes of each segment is inverted according to the second orthogonal pattern, and
each orthogonal pattern, of the plurality of orthogonal patterns, being different from every other orthogonal pattern of the plurality of orthogonal patterns; and
determine the first repetitive data, transmitted by the first UE of the plurality of UEs, based on applying a first orthogonal pattern, of the plurality of orthogonal patterns, to each segment of subframes of the repetitive data,
the first repetitive data having been transmitted by the first UE using the particular set of radio resources, and the first repetitive data being different from the second repetitive data currently transmitted by the second UE using the particular set of radio resources.

9. The non-transitory computer-readable medium of claim 8, where the one or more instructions, when executed by the one or more processors, further cause the one or more processors to:
identify the plurality of UEs as a group of UEs to transmit the repetitive data a set amount of times using a same set of radio resources; and
assign the plurality of orthogonal patterns to the plurality of UEs based on identifying the plurality of UEs as the group of UEs to transmit the repetitive data using the same set of radio resources.

10. The non-transitory computer-readable medium of claim 9, where the one or more instructions, when executed by the one or more processors, further cause the one or more processors to:
determine a plurality of channel coherence times corresponding to the plurality of UEs,
the channel coherence time being a temporal interval over which a phase of a radio wave at a given point can be predicted; and
where the instructions, that cause the one or more processors to identify the plurality of UEs as the group of UEs to transmit the repetitive data using the same set of radio resources, are to:
identify the plurality of UEs as the group of UEs to transmit the repetitive data using the same set of radio resources based on the plurality of channel coherence times.

11. The non-transitory computer-readable medium of claim 9, where the one or more instructions, when executed by the one or more processors, further cause the one or more processors to:
provide information associated with the plurality of orthogonal patterns to the plurality of UEs based on assigning the plurality of orthogonal patterns to the plurality of UEs.

12. The non-transitory computer-readable medium of claim 8, where the one or more instructions, when executed by the one or more processors, further cause the one or more processors to:
schedule the plurality of UEs to transmit the repetitive data using the particular set of radio resources.

13. The non-transitory computer-readable medium of claim 8, where the one or more instructions when causing the one or more processors to apply the first orthogonal pattern to the segments of subframes of the repetitive data, cause the one or more processors to:
selectively invert symbols in a subframe, of each of the segments of subframes, in accordance with the first orthogonal pattern.

14. The non-transitory computer-readable medium of claim 8, where the one or more instructions, when executed by the one or more processors, further cause the one or more processors to:
identify the plurality of orthogonal patterns based on receiving the repetitive data transmitted using the particular set of radio resources.

15. A method, comprising:
receiving, by a device, repetitive data transmitted using a particular set of radio resources,
the repetitive data including first repetitive data being transmitted multiple times in consecutive segments by a first user equipment (UE) while second repetitive data is transmitted multiple times in consecutive segments by a second UE, the first repetitive data transmitted by the first UE using the particular set of radio resources, and the second repetitive data concurrently transmitted by the second UE using the particular set of radio resources;

applying, by the device, a first orthogonal pattern, assigned to the first UE, to each consecutive segment of subframes of the repetitive data such that at least one symbol in the subframes of each segment is inverted according to the first orthogonal pattern;

applying, by the device, a second orthogonal pattern, assigned to the second UE, to each consecutive segment of subframes of the repetitive data such that at least one other symbol in the subframes of each segment is inverted according to the second orthogonal pattern;

determining, by the device, the first repetitive data based on applying the first orthogonal pattern to each segment of subframes of the repetitive data; and determining, by the device, the second repetitive data based on applying the second orthogonal pattern to each segment of subframes of the repetitive data.

16. The method of claim 15, further comprising:

identifying the first UE and the second UE as UEs to transmit using a same set of radio resources; and assigning the first orthogonal pattern to the first UE and the second orthogonal pattern to the second UE based on identifying the first UE and the second UE as UEs to transmit using the same set of radio resources.

17. The method of claim 16, further comprising:

determining a first repetition time, associated with the first UE, and a second repetition time associated with the second UE; and determining a first channel coherence time, associated with the first UE, and a second channel coherence time, associated with the second UE; and where identifying the first UE and the second UE as UEs to transmit using the same set of radio resources comprises:

identifying the first UE and the second UE as UEs to transmit using the same set of radio resources based on the first repetition time, the second repetition time, the first channel coherence time, or the second channel coherence time.

18. The method of claim 15, further comprising:

providing information associated with the first orthogonal pattern to the first UE to permit the first UE to apply the first orthogonal pattern when transmitting the first repetitive data; and providing information associated with the second orthogonal pattern to the second UE to permit the second UE to apply the second orthogonal pattern when transmitting the second repetitive data.

19. The method of claim 15, further comprising:

scheduling the first UE to transmit the first repetitive data using the particular set of radio resources; and scheduling the second UE to transmit the second repetitive data using the particular set of radio resources.

20. The method of claim 15, where applying the first orthogonal pattern to the repetitive data comprises:

selectively inverting symbols in a subframe, of a segment of subframes of the repetitive data, based on the first orthogonal pattern.

* * * * *